Oct. 27, 1925.  
O. D. SCHVARTZ  
STEERING MECHANISM FOR VEHICLES  
Filed May 24, 1924  
1,559,050  
4 Sheets-Sheet Inventor  
O. D. Schvartz  
by his Attorneys  
Baldwin Wight.

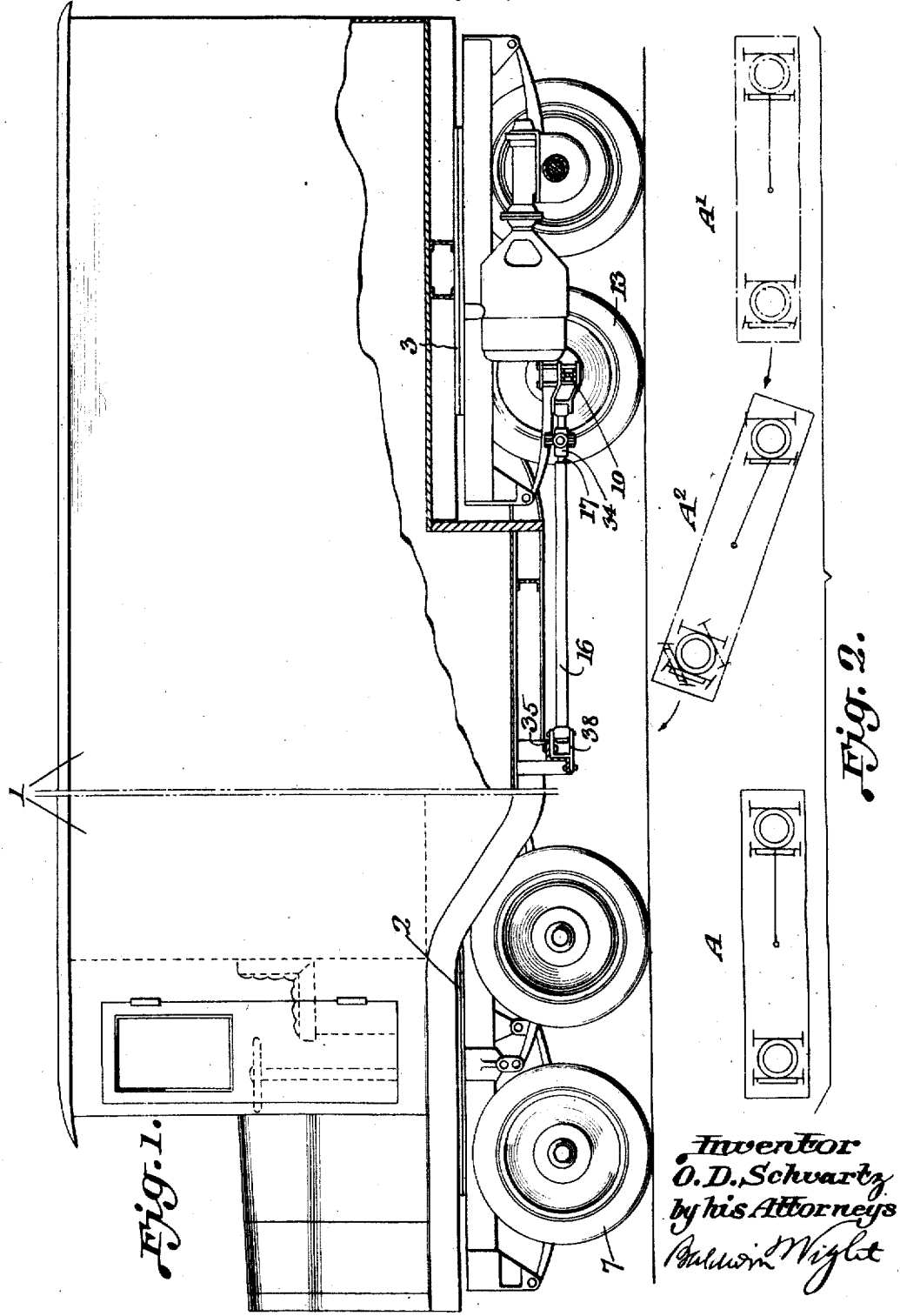

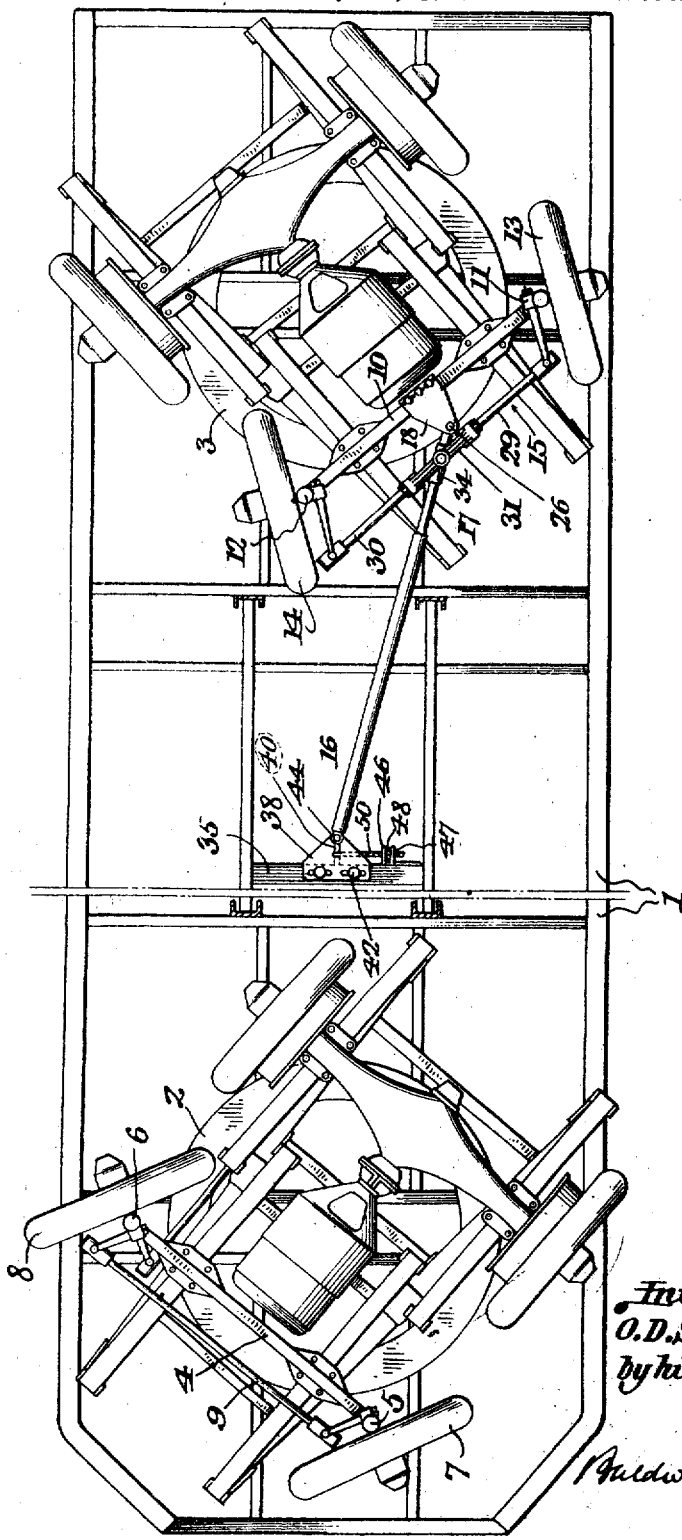

Patented Oct. 27, 1925.

1,559,050

UNITED STATES PATENT OFFICE.

OSCAR DANIEL SCHVARTZ, OF HUDSON, NEW YORK, ASSIGNOR, BY MESNE ASSIGNMENTS, TO VERSARE CORPORATION, A CORPORATION OF NEW YORK.

STEERING MECHANISM FOR VEHICLES.

Application filed May 24, 1924. Serial No. 715,642.

*To all whom it may concern:*

Be it known that I, OSCAR DANIEL SCHVARTZ, a subject of the King of Sweden, and resident of Hudson, in the county of Columbia and State of New York, have invented certain new and useful Improvements in Steering Mechanism for Vehicles, of which the following is a specification.

Large trucks or busses or vehicles, such as tractors and trailers, are subject to many restrictions in their use because of the difficulty of driving and turning vehicles of such length in relatively narrow streets and crowded traffic.

An object of the invention is to provide steering mechanism applicable to such vehicles which will overcome all existing objections on these grounds and enable the vehicles to be guided easily through crowded traffic and turn completely without backing in a relatively narrow space.

It is primarily designed for large metropolitan busses, and the desired result is accomplished by placing four wheels on a front truck unit and employing another rear truck unit also having four wheels. Each truck unit of four wheels can turn to any desired position relative to the body by means of a fifth wheel.

Each truck unit has its front wheels provided with the usual steering knuckles, tie rod and axle similar to the usual or standard type construction for motor vehicles. The front truck unit is manually steered by any desired means although preferably by means such as disclosed in my copending application Serial No. 719,819 filed June 13, 1924, or a co-pending application of O. F. Warhus Serial No. 745,875, filed October 25, 1924.

The rear truck unit is steered by means of a telescoping rod fastened at its front end at a selected point on the body of the vehicle and at its rear end to the front axle of the rear truck. A suitable connection is provided between the telescoping rod and the tie rod which is connected to the steering knuckles of the front wheels of the rear truck. The effect of this is to turn the front wheels. When the front truck is steered manually to carry the forward end of the body to one side, this movement of the body carries the front end of the telescopic rod to one side and thereby turns that rod about its pivotal connection to the rear truck. This movement of the rod operates through the tie-rod to turn the front wheels about the pivotal connections of their stub-shafts to the front axle. The angular position to which the front wheels of the rear truck are thus turned operates, as the vehicle moves forward, to turn the rear truck relatively to the body. This action of the rear truck is a delayed action for it is effected by the lateral movement of the forward portion of the body, and secondarily by the turning movement of the front wheels of the rear truck. The result is that the rear truck turns to make the curve which the front truck has made or is making; the wheels of the rear truck do not follow the tracks of the wheels of the front truck but instead take a somewhat different curvature which is governed largely by the point on the body where the telescopic rod is connected and the arrangement of the connections from that rod to the stub-shafts of the front wheels of the rear truck at an angle different from the angle at which any of the other wheels of the vehicle are set at any given time.

The connections between the telescoping rod and the rear truck and between said rod and the body of the vehicle may be adjustable. The point of connection between the rod and the vehicle may be varied according to the precise result desired.

Other features of the invention will be apparent from the following detailed description and the appended claims.

In the drawings:

Figure 1 is a side elevation of the front and rear portions of a vehicle equipped with my invention.

Figure 2 is a diagrammatic view showing different positions assumed by the vehicle when turning.

Figure 3 is a bottom plan view of the front and rear trucks and connections when turning.

Figure 4:
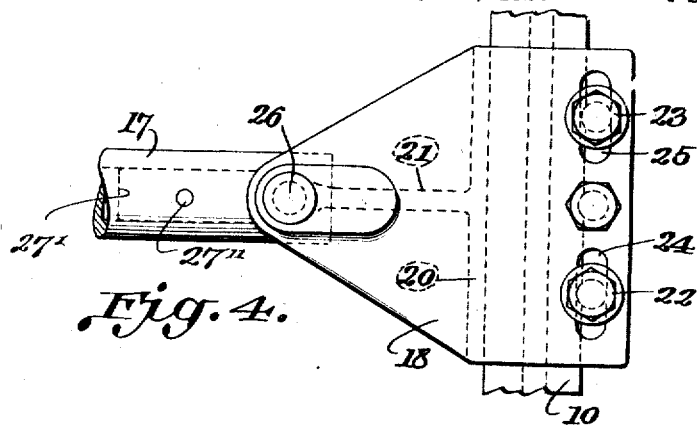
Figure 4 is a top plan view of a clamp on the front axle of the rear truck.

The body 1 of the vehicle may be of any usual or desired type. It is supported on two truck units by means of fifth wheels 2 and 3 which permit each truck unit to assume any desired angular position with reference to the body of the vehicle. The front truck unit has a front axle 4 provided with stub axles 5 and 6, on which are mounted wheels 7 and 8. The stub axle arms are connected by a tie rod 9 which is given a steering movement in any desired manner, such for instance as that described in one or the other of the applications for patents above identified. The supporting springs and the general character of this truck unit may be of any type so far as this invention is concerned.

Similarly the rear truck unit has a front axle 10, stub axles 11 and 12 supporting wheels 13 and 14, and a tie rod 15 given a movement as hereinafter set forth. The other features of this unit may be of any desired character so far as the present invention is concerned.

When the front truck is turned by the steering mechanism, the turning movement is transmitted to the rear truck by the mechanism, now to be described. A telescopic rod composed of two parts 16 and 17 connects the front axle of the rear truck with a selected part of the vehicle body a considerable distance in front thereof.

Figure 5:
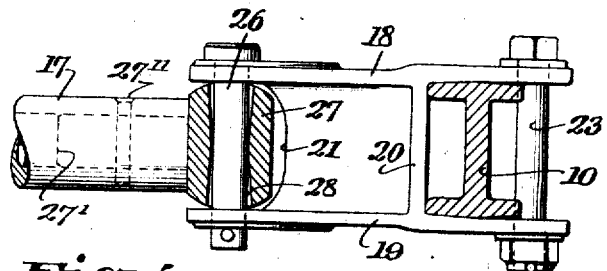
Figure 5 is a vertical longitudinal section of the same.

A clamp such as shown in Figures 4 and 5 is attached to the front axle of the rear truck. This clamp comprises upper and lower plates 18 and 19 joined by a transverse web 20 and a longitudinal web 21. The rear portions of the plates project beyond the axle and are drawn into engagement therewith by bolts 22 and 23 working through elongated slots 24 and 25. When these bolts are drawn tight, they will clamp the plates in adjusted position upon the axle. The plates 18 and 19 taper toward the front end where they are connected by a pivot bolt 26 which works in an opening in a member 27 having a short stem 27' attached by a bolt or pin 27" to the rear end of the portion 17 of the telescopic rod. The opening 28 in this member is of a size at the center to fit the pivot pin or bolt 26, but tapers towards each end as shown in Figure 5, permitting a certain amount of oscillation of the telescopic rod relative to the clamp.

Figure 6:
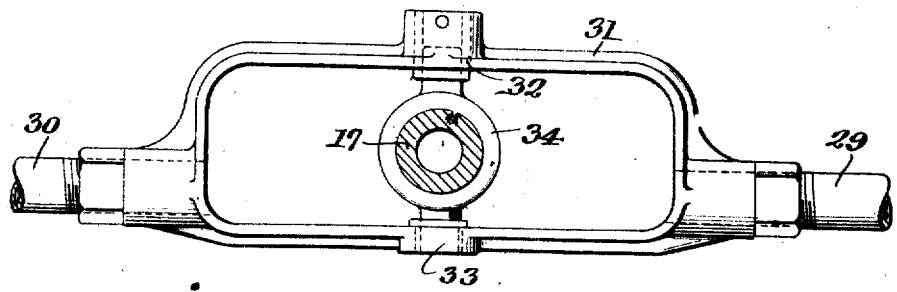
Figure 6 is a side elevation partly in section of the connection between the telescopic rod and the tie rod.
Figure 7:
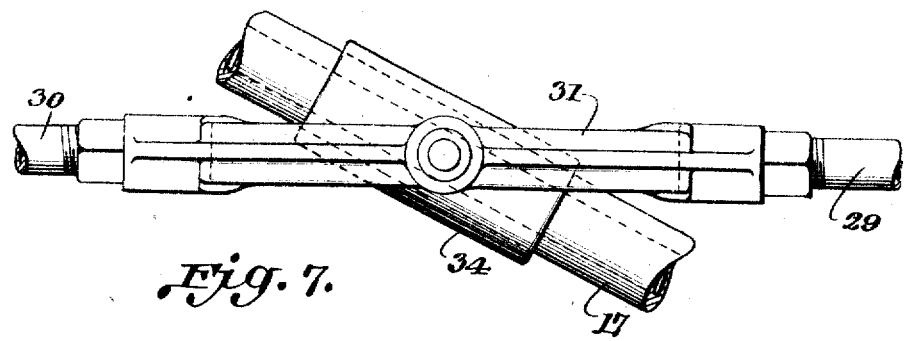
Figure 7 is a top plan view of the same.

The tie rod 15 instead of being a single member, is composed of two rods 29 and 30 connected near the middle by a loop 31 as shown in Figures 6 and 7. This loop has upper and lower central bearings 32 and 33 which receive pintles extending from a short sleeve 34 through which slides freely the rear portion 17 of the telescopic rod.

Figure 8:
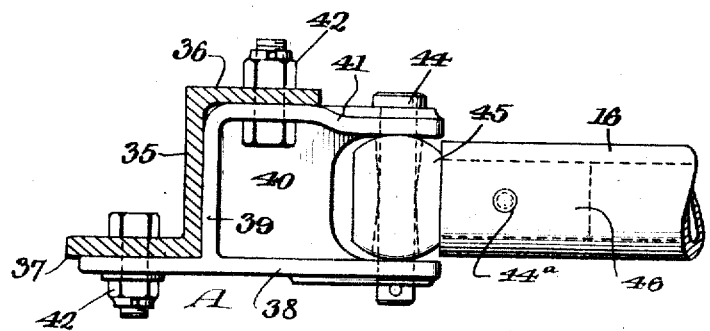
Figure 8 is a vertical section with parts in elevation, of the connections between the telescopic rod and the body of the vehicle.
Figure 9:
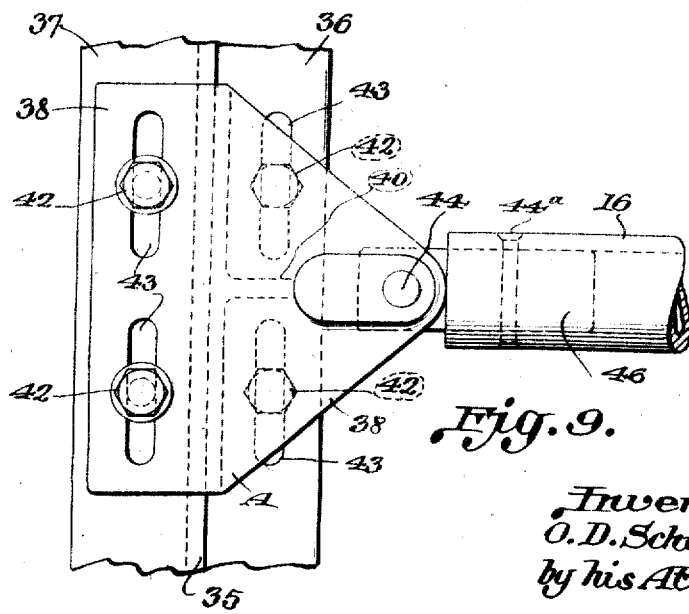
Figure 9 is a bottom plan view of the same.

The front end of the portion 16 of the telescopic rod is attached to the vehicle body by the following mechanism. At any desired point near the longitudinal center of the vehicle and as far in front of the rear truck as may be deemed desirable, the body is provided with an angular bracket member 35 of the form shown in Figure 8. This member has a vertical portion connected by two horizontal portions 36 and 37. A member A has a bottom plate 38 attached by a transverse rib 39 and a longitudinal rib 40 to a top plate 41. The bottom plate fits against the portion 37 of the bracket, the transverse rib fits against the vertical portion of the bracket, and the top plate fits against the top portion 36 of the bracket on the under side thereof. Bolts 42 fitting in elongated slots 43 serve to clamp the member to the bracket. At their rear, the upper and lower plates of the member have a pivot bolt 44 which passes through a hole in a ball shaped member 45 having a short stem 46 attached to the front member 16 of the telescopic rod by means of a pin or bolt 44. The opening in the member 45 fits the pivot bolt at its center, but tapers outwardly permitting considerable oscillation of the telescopic rod relative to the clamp.

In Figure 3 is shown a means for readily adjusting the position of the member to which the front end of the rod 16 is attached. A rod 50 may be attached to the longitudinal rib 40 and have a threaded end passing freely between ears 46 and 47. A nut 48 is threaded on the rod between the ears, and when the bolts 42 are loosened, turning the nut will move the rod 50 endwise and therefore adjust the position of the member and the front end of the rod 16 relative to the bracket 35.

It is to be understood that the precise means for attaching the ends of the telescopic rod to the body and to the front axle and tie rod of the rear truck may be varied without departing from the invention. Although I have shown a preferred form, this may be changed so long as certain essential principles are retained. Similarly the means provided for effecting the lateral shift of the connection of the front end of the telescopic rod 16 to the body of the vehicle may be varied in construction as desired as may also the extent of the range over which that adjustment may be effected.

The operation of the device is as follows. When the vehicle is at rest near the curb, all four wheels of each truck are parallel with the curb as shown in diagram A of Figure 2. When it is desired to make a turn the front wheels of the truck front truck will be turned by the manual steering mechanism as shown in diagram A' of Figure 2. In the first part of the turning movement, little or no turning movement is imparted to the rear truck. As soon as the body begins to swing the point of attachment of the front end of the telescopic rod will begin to move sidewise. In other words, it has a lateral movement of translation. This will cause the tie rod 15 of the rear truck to move sidewise in the same direction but much more slowly since the point of operative engagement of the telescopic rod with the tie rod is so much closer to its point of attachment with the front axle of the rear truck than it is to the point of attachment to the vehicle body. The turning movement of the rear truck is therefore delayed and this results in marked practical advantages.

As a concrete example of the operation, it may be described as follows. Suppose it is desired to turn a thirty foot vehicle completely around in a thirty-five foot street without backing. The vehicle is assumed to be standing near the curb on one side of the street with all wheels parallel to the body and the curve. The driver now turns the steering wheel and by this the front wheels at an angle of approximately 22½° to the curb and toward the center of the street. The power is applied and as the vehicle moves forward the angular position of the front wheels of the front truck causes that truck to turn angularly relatively to the body and the front truck proceeds in the arc of a circle, carrying the front end of the body with it. The driver need pay no attention to any other part of the vehicle, but when the front wheels reach a position approximately parallel with the curb on the other side of the street, he will straighten the angle of the front wheels of the front truck to be parallel with the curb and the rear wheels of the front truck, and on further movement the front truck will turn realtively to the body until finally it is parallel to the length thereof.

During this turning movement, the body of the vehicle has been turning at an angle to the curb and at an angle to the rear truck, thus moving the front end of the rod 16—17 and through the connections described turning the front wheels of the rear truck. Since the front truck will be about half way across the street before the rear truck has advanced more than ten or fifteen feet, the body angle has not been such as to draw the rear truck away from the curb beyond a few inches. The front wheels of the rear truck have now been turned at an angle of approximately 12° to 15° and this angle is greatly increased within the next few feet of travel until it reaches approximately a maximum of 25° which, together with the turning movement of the rear truck relatively to the body caused by the travel of the truck when its front wheels are turned angularly, causes the tracking of the rear truck to be brought to within less than three feet of the tracking of the front truck in making this turn.

The turning of the front wheels may be substantially in the arc of a circle, or a semi-circle in making the complete turn. The tracking of the front wheels of the rear truck are in a line approaching a semi-ellipse. It therefore follows that the tracking of the rear truck always lies within the tracking of the front truck, or at least never goes outside of the same. There is for this reason no tendency for the rear wheels to run up on the curb when turned from a point adjacent thereto. Fig. 3 represents the relation of the parts at the middle of the turn.

As stated, the front end of the rod 16—17 may be attached to the vehicle body at an desired point, and the ratio between the points of connection of this rod with the vehicle, the front axle of the rear truck and its point of engagement with the tie rod of the rear truck may be so selected as to obtain any desired degree of delay regardless of the length of body of the vehicle. Whenever the front truck is steered, the body is moved sidewise and, this movement is communicated to the front wheels of the rear truck through the telescoping rod as explained.

This rod is made telescopic in order to allow for the necessary variation in length when moving from the straight ahead to the angular positions, and similarly the rod slides through the sleeve 31 for the same reason.

It is obvious that various details may be changed and parts of the invention modified without in any way departing from the spirit thereof. While a preferred form has been illustrated, applicant desires it understood that the invention is to be regarded as limited only by the scope of the appended claims.

I claim as my invention:

1. In a vehicle, a body, a truck having front and rear wheels on which the rear portion of the body is pivotally mounted, the front wheels of the truck being pivotally mounted on the truck to turn about two separate substantially vertical axes, a member operatively connected to the body and mounted so that a portion thereof has a lateral movement of translation relative to the truck when the forward portion of the body moves laterally, and connections from said portion of the member to the front wheels of the truck for turning those wheels about their separate axes when said portion of the member moves laterally.

2. In a vehicle, a body, a truck having front and rear wheels on which the rear portion of the body is pivotally mounted, the front wheels of the truck being pivotally mounted on the truck to turn about substantially vertical axes, a rod pivotally connected at its forward end to the body and at its rear end to the truck, and a connection from the said rod to the front wheels of the truck for turning those wheels relatively to the truck when the forward portion of the body moves laterally.

3. In a vehicle, a body, a truck having front and rear wheels on which the rear portion of the body is pivotally mounted, the front wheels of the truck being pivotally mounted on the truck to turn about substantially vertical axes, a rod pivotally connected at its forward end to the body and at its rear end to the truck, a connection from the rod to the front wheels of the truck for turning those wheels relatively to the truck when the forward portion of the body moves laterally, and means for shifting laterally of the body the point of connection of said rod to the body of the vehicle.

4. In a vehicle, a body, a truck having front and rear wheels on which the rear portion of the body is pivotally mounted, stub-shafts pivotally mounted on the truck and supporting the front wheels thereof, crank arms on the stub-shafts, a telescopic rod pivotally connected at its forward end to the body and at its rear end to the truck and connections from said rod to the crank arms of the said stub-shafts and pivotally connected to both of them.

5. In a vehicle, a body, a truck upon which the rear portion of the vehicle is supported provided with front and rear wheels and pivotal mountings for the front wheels permitting them to be turned about substantially vertical axes, and an automatic steering mechanism for the rear truck including a rod pivotally connected at its forward end to the body of the vehicle and at its rear end to the truck and connections from the rod to the front wheels of the truck whereby those wheels are turned about their substantially vertical axes by lateral movement of the forward portion of the body.

6. In a vehicle, a body, a truck having front and rear wheels on which the rear portion of the body is pivotally mounted, the front wheels of the truck being pivotally mounted on the truck to turn about two separate substantially vertical axes, a member pivotally connected to both the body and to the truck, and connections from said member to the front wheels of the truck for turning those wheels relatively to the truck about their separate axes when the forward portion of the body moves laterally.

7. In a vehicle, a body, a truck having front and rear wheels on which the rear portion of the body is pivotally mounted, the front wheels of the truck being pivotally mounted on the truck to turn about two separate substantially vertical axes, a member connected to the body and extending lengthwise thereof and actuated by turning movement of the body relatively to the truck, and connections extending laterally from said member to the front wheels about their separate axes of the truck for turning those wheels when the forward portion of the body moves laterally.

In testimony whereof, I have hereunto subscribed my name.

OSCAR DANIEL SCHVARTZ.

front and rear wheels on which the rear portion of the body is pivotally mounted, the front wheels of the truck being pivotally mounted on the truck to turn about substantially vertical axes, a rod pivotally connected at its forward end to the body and at its rear end to the truck, and a connection from the said rod to the front wheels of the truck for turning those wheels relatively to the truck when the forward portion of the body moves laterally.

3. In a vehicle, a body, a truck having front and rear wheels on which the rear portion of the body is pivotally mounted, the front wheels of the truck being pivotally mounted on the truck to turn about substantially vertical axes, a rod pivotally connected at its forward end to the body and at its rear end to the truck, a connection from the rod to the front wheels of the truck for turning those wheels relatively to the truck when the forward portion of the body moves laterally, and means for shifting laterally of the body the point of connection of said rod to the body of the vehicle.

4. In a vehicle, a body, a truck having front and rear wheels on which the rear portion of the body is pivotally mounted, stub-shafts pivotally mounted on the truck and supporting the front wheels thereof, crank arms on the stub-shafts, a telescopic rod pivotally connected at its forward end to the body and at its rear end to the truck and connections from said rod to the crank arms of the said stub-shafts and pivotally connected to both of them.

5. In a vehicle, a body, a truck upon which the rear portion of the vehicle is supported provided with front and rear wheels and pivotal mountings for the front wheels permitting them to be turned about substantially vertical axes, and an automatic steering mechanism for the rear truck including a rod pivotally connected at its forward end to the body of the vehicle and at its rear end to the truck and connections from the rod to the front wheels of the truck whereby those wheels are turned about their substantially vertical axes by lateral movement of the forward portion of the body.

6. In a vehicle, a body, a truck having front and rear wheels on which the rear portion of the body is pivotally mounted, the front wheels of the truck being pivotally mounted on the truck to turn about two separate substantially vertical axes, a member pivotally connected to both the body and to the truck, and connections from said member to the front wheels of the truck for turning those wheels relatively to the truck about their separate axes when the forward portion of the body moves laterally.

7. In a vehicle, a body, a truck having front and rear wheels on which the rear portion of the body is pivotally mounted, the front wheels of the truck being pivotally mounted on the truck to turn about two separate substantially vertical axes, a member connected to the body and extending lengthwise thereof and actuated by turning movement of the body relatively to the truck, and connections extending laterally from said member to the front wheels about their separate axes of the truck for turning those wheels when the forward portion of the body moves laterally.

In testimony whereof, I have hereunto subscribed my name.

OSCAR DANIEL SCHWARTZ.

Certificate of Correction.

It is hereby certified that in Letters Patent No. 1,559,050, granted October 27, 1925, upon the application of Oscar Daniel Schwartz, of Hudson, New York, for an improvement in "Steering Mechanisms for Vehicles," errors appear in the printed specification requiring correction as follows: Page 1, lines 48 and 49, strike out the words "of the rear truck"; same page, line 50, after the word "wheel" insert the words *of the rear truck at an angle different from the angle at which any of the other wheels of the vehicle are set at any given time;* page 4, lines 73 and 74, claim 7, strike out the words "about their separate axes" and insert the same to follow after the word "wheels" in line 75; and that the said Letters Patent should be read with these corrections therein that the same may conform to the record of the case in the Patent Office.

Signed and sealed this 15th day of December, A. D. 1925.

[SEAL.]

WM. A. KINNAN,
*Acting Commissioner of Patents.*

1,559,050

Certificate of Correction.

It is hereby certified that in Letters Patent No. 1,559,050, granted October 27, 1925, upon the application of Oscar Daniel Schvartz, of Hudson, New York, for an improvement in "Steering Mechanism for Vehicles," errors appear in the printed specification requiring correction as follows: Page 1, lines 48 and 49, strike out the words " of the rear truck "; same page, line 50, after the word " wheels " and before the period insert the words *of the rear truck at an angle different from the angle at which any of the other wheels of the vehicle are set at any given time;* same page, lines 78 to 81, strike out the words " at an angle different from the angle at which any of the other wheels of the vehicle are set at any given time "; page 4, lines 73 and 74, claim 7, strike out the words " about their separate axes " and insert the same to follow after the word " wheels " in line 75; and that the said Letters Patent should be read with these corrections therein that the same may conform to the record of the case in the Patent Office.

This Certificate supersedes Certificate of Correction issued December 15, 1925.

Signed and sealed this 19th day of January, A. D. 1926.

[SEAL.]

WM. A. KINNAN,
*Acting Commissioner of Patents.*